United States Patent

[11] 3,580,590

[72] Inventor John F. Zotter
 Southington, Conn.
[21] Appl. No. 874,927
[22] Filed Nov. 7, 1969
[45] Patented May 25, 1971
[73] Assignee Textron Inc.,
 Providence R.I.,

[54] BEARING SEAL CONSTRUCTION
 5 Claims, 7 Drawing Figs.
[52] U.S. Cl. .................................................. 277/227,
 277/212, 308/187.2
[51] Int. Cl. ...................................................... F16j 15/32
[50] Field of Search.......................................... 277/227,
 231, 232, 233, 212; 308/187.1, 187.2

[56] References Cited
 UNITED STATES PATENTS
2,310,607 2/1943 Batesole....................... 277/212X
2,757,052 7/1956 Spurgeon..................... 277/212X
2,967,743 1/1961 Howe............................ 277/212X Primary Examiner—Laverne D. Geiger
Assistant Examiner—Robert I. Smith
Attorney—Sandoe, Hopgood and Calimafde ABSTRACT: The invention contemplates a laminated seal construction and method utilizing a flat annular sheet of flexible material, such as elastomeric material, laminated to a backing material, which at an axially thick portion defines a body, and which at an axially thin portion defines a seal member to be axially resilient deflected with respect to the body. The method of the invention calls for removing backing material after the laminating step, the removed material affording a remainder which meets all requirements as to concentricity, circumferential uniformity of action, and the like. The material-removing step may be so characterized as to provide a local region for axial flexure, radially spaced from the region of wiping contact with the bearing ring to which it is sealingly engaged.

PATENTED MAY 25 1971 3,580,590
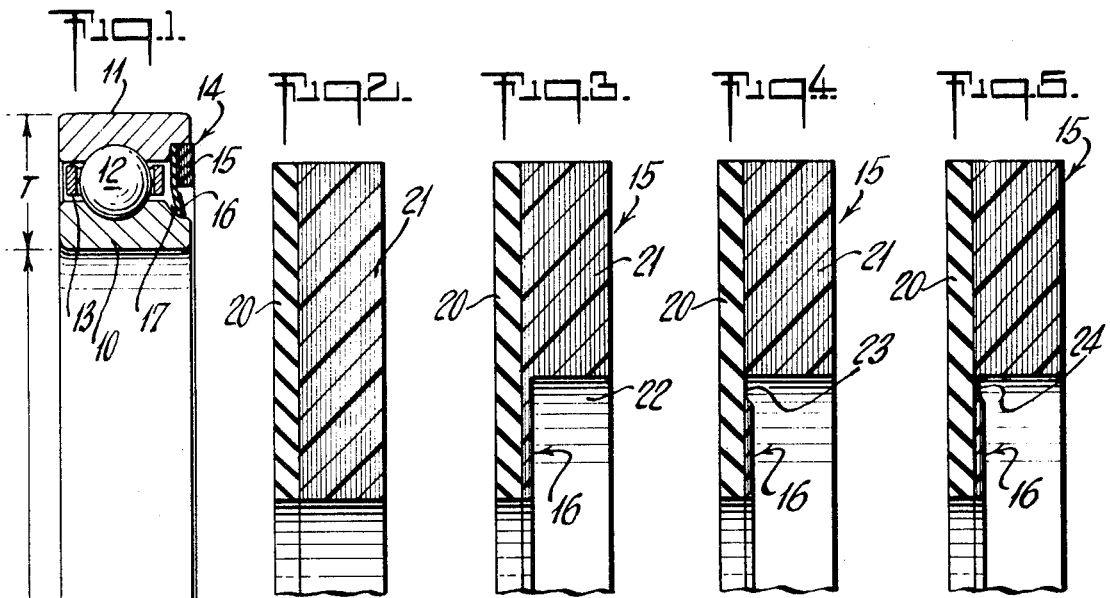
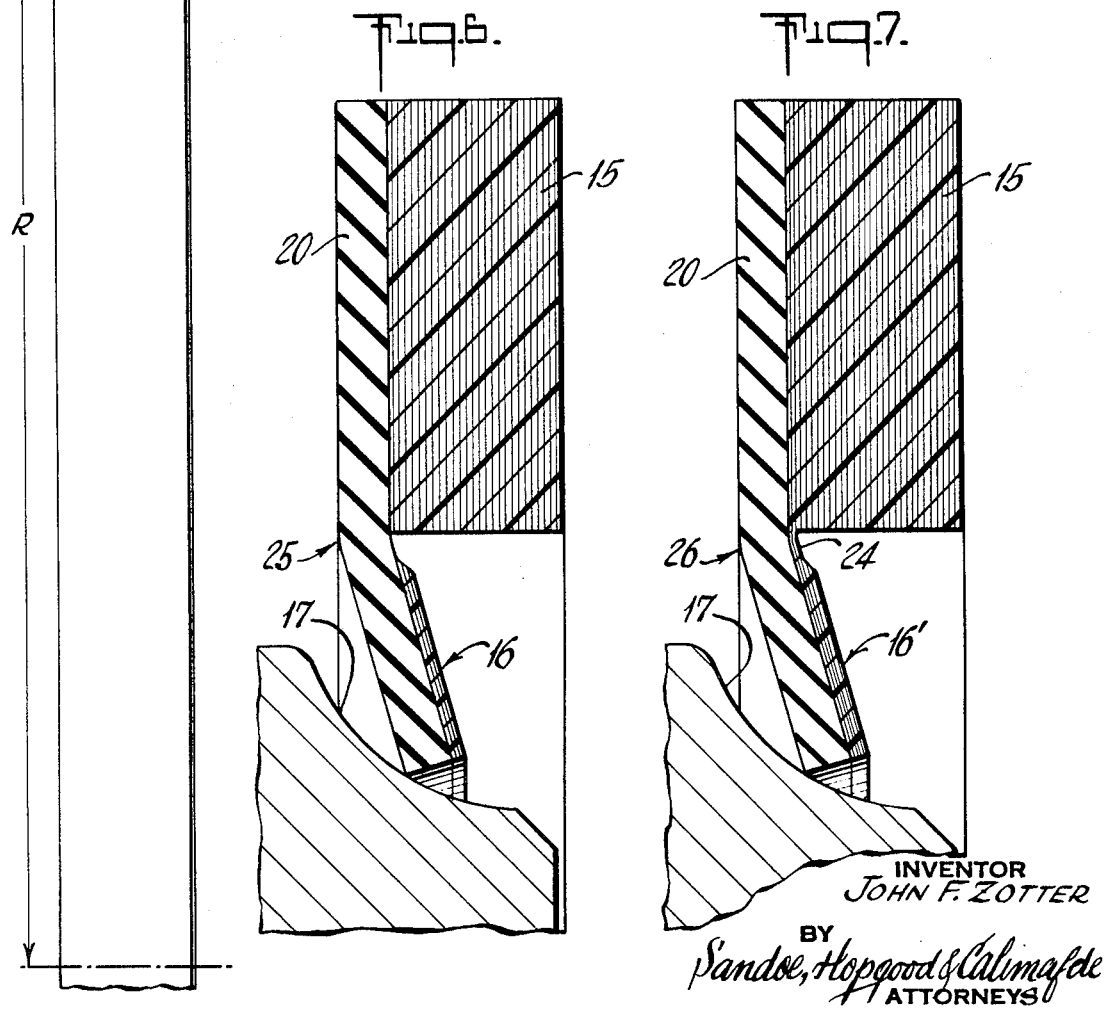
INVENTOR
JOHN F. ZOTTER
BY
Sandoe, Hopgood & Calimafde
ATTORNEYS

3,580,590

BEARING SEAL CONSTRUCTION

This invention relates to a seal construction, particularly suited to sealing an axial end of an antifriction bearing.

In bearings of the character indicated, it is a common practice to use the deflected flexible lip of resilient seal material to provide light, axially preloaded, wiping contact to develop the seal without affecting the rotary action of the bearing rings. Various stiffening structures have been provided to determine the axial preload on the seal action, and to assure desired shape of the lip of the seal, but so far as is known to me none of these prior structures or techniques is applicable to antifriction bearings in which the overall radial extent of the bearing elements (i.e., radial distance, from the bore of the inner ring, to the periphery of the outer ring) is very much exceeded by the radius of the bore. One source of difficulty lies in the relatively great expense of fabricating a stiffening member which must be of thickness that affords uniform yieldability over the entire circumferential extent of the seal and which is nevertheless strictly circular and concentrically assembled with respect to the seal material and with respect to the bearing ring which carries the seal structure.

It is, therefore, an object of the invention to provide an improved seal structure avoiding the above-noted difficulties and particularly applicable to antifriction bearings of the relatively large bore proportions indicated.

Another object is to provide seal structure meeting the above object with economy of manufacturing and material cost.

A further object is to provide an improved method of making seals for such bearings.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIG. 1 is a vertical sectional view of a bearing incorporating a seal of the invention;

FIGS. 2, 3 and 4 are similar fragmentary sectional views to illustrate steps in the making of a seal of the invention;

FIG. 5 is a view similar to FIG. 4 to illustrate a modification; and

FIGS. 6 and 7 are enlarged fragmentary sectional views illustrating seal action for the respective forms of FIGS. 4 and 5.

Briefly stated, the invention contemplates a laminated seal construction and method utilizing a flat annular sheet of flexible material, such as elastomeric material, laminated to a backing material, which at an axially thick portion defines a body, and which at an axially thin portion defines a seal member to be axially resiliently deflected with respect to the body. The method of the invention calls for removing backing material after the laminating step, the removed material affording a remainder which meets all requirements as to concentricity, circumferential uniformity of action, and the like. The material-removing step may be so characterized as to provide a local region for axial flexure, radially spaced from the region of wiping contact with the bearing ring to which it is sealingly engaged.

In the drawings, FIG. 1 illustrates an antifriction bearing comprising inner and outer race rings 10—11, with plural balls 12 riding raceways in said rings. Retainer structure is indicated at 13, for angularly spacing the balls 12. The overall radial thickness $T$ of the bearing section is very greatly exceeded by the radius $R$ of the bore of the inner ring 10. A seal structure 14 of the invention includes a body member 15 seated in a counterbore at one axial end of the outer ring 11; the seal structure also includes a seal member 16 having resilient, axially preloaded, wiping and sealing contact with a rabbeted peripheral end surface 17 of the inner ring 10. The seal 14 is shown projecting slightly beyond the axial end of outer ring 11, but this will be understood to allow for tight compression of seal 14 against a mounting shoulder (not shown) when the bearing is installed and in use.

The detailed construction of seal 14 will be better understood from a description of its method of manufacture, illustrated in FIGS. 2 to 4.

The laminated seal blank of FIG. 2 is first selected or prepared. It comprises a flat annulus 20 of flexible material, such as an elastomeric material, bonded in a single radial plane to a relatively thick body 21 of stiff backing material. The inner and outer radial limits of the blank of FIG. 2 may be determined by the mold (not shown) in which the bond and plastic are cured; these limits preferably match the ultimate outside dimensions of the seal structure 14. The backing material may be of metal but is preferably a cured and hardened plastic laminate, such as a fabric-reinforced phenolic, epoxy or the like. Thin vertical hatch lines in the drawing suggest a preference for having the fabric laminations parallel to the bonding plane.

FIG. 3 illustrates the next step wherein backing material is locally removed to define separate seal-member and body-member portions 15—16 of the structure. If the seal structure is to be carried by the inner ring, then the backing material should be removed from the radially outer part of the backing 21; however, in the present form, the seal 14 is carried by the outer ring 11, so that material is shown removed at 22 from the backing 21. In order that the body member 15 may be substantially rigid, the backing material thereof is preferably of substantially greater thickness than the layer of seal-lip material 20; also, to achieve relative flexibility in the seal member 16, the backing material is preferably of substantially lesser thickness than the layer 20. It will be appreciated that for certain applications it may be desired to leave the seal member 16 integral with the body member 15, as shown in FIG. 3.

It is, however, preferred that a region of predominant flexibility be established between the wiping-contact region (i.e., at contact with surface 17) and the body member 15. In FIGS. 4 and 5, this is achieved by further removing backing material 21 at an annular region between the members 15—16. In FIG. 4, all backing material 21 is removed at such a region 23, and in FIG. 5 only the thinnest layer of backing material 21 is left at the corresponding region 24. It will be appreciated that for the FIG. 5 situation, the reinforcing material (e.g., fabric) for at least the lamination adjacent the radial plane of bonding is preferably sufficiently thin to assure uncut fabric material in said lamination at the region 24. And it is also preferred that the seal member 16 shall be of such thickness as to include at least one reinforcing lamination that is substantially unimpaired in the course of removing material at 22.

FIGS. 6 and 7 illustrate the sealing engagement with the rabbeted surface 17, for the respective forms of FIGS. 4 and 5. Resilient axial deflection is seen to be radially localized, at 25—26, respectively, remote from the zone of seal-wiping contact. In FIG. 6, the layer 20 alone provides the flexible connection, and in FIG. 7 the section 24 is so reduced as to be flexible and thus to assist the flexible layer 20.

It will be seen that the invention provides an improved method and seal meeting the stated objectives. No particular machining problems are presented because the removal of material at 23 or 24 is a final operation, meaning that good body support in material 21 exists for all machining up to that point. The resulting installed seal not only exhibits a stiffer axial loading for a given axial deflection, but also has the stiffness to assure an excellent continuous seal for unusually proportioned large-bore bearings; additionally, a hard protective shell is presented to preserve the softer seal layer 20. Moreover, the added stiffness of the seal lip resists seal opening even under the adverse condition of high-pressure impingement of cleaning fluids.

While the invention has been described in detail for the embodiments shown, modifications may be made without departing from the scope of the invention.

I claim:

1. A laminated seal for a bearing, comprising a ring-shaped flat lamination of flexible material laminated in a single radial plane to relatively stiff backing material, said backing material being axially relatively thick near one of the radial limits of said flexible material to define a body member, and said backing material being axially relatively thin near the other radial limit of said flexible material to define a seal member, whereby said body member and said seal member may be axially resiliently yieldably displaced with respect to each other to apply axial preload for sealed engagement of flexible material with a bearing surface, and also whereby circumferentially continuous and relatively stiff backing support is provided for the flexible material of said seal member at the region of seal engagement, and further whereby a relatively hard circumferential shield is presented externally of the sealing flexible material as a protection for the sealing flexible material.

2. The seal of claim 1, wherein the backing material of said body and seal members is radially continuous adjacent the radial plane of lamination to the flexible material.

3. The seal of claim 2, wherein the axially thinnest portion of the backing material is localized at the region of juncture of said body member with said seal member; thereby localizing, at substantially said region, the relative yieldability of said members.

4. The seal of claim 1, in which the backing material of said body member is radially continuous adjacent the radial plane of lamination to the flexible material, in which the backing material of said seal member is radially continuous adjacent the radial plane of lamination to the flexible material, and in which a localized annular region of the flexible material between said body and seal members is free of backing material.

5. The seal of claim 1, in which the thickness of backing material at said body member substantially exceeds the thickness of the flexible material, and in which the thickness of backing material at said seal member is substantially less than the thickness of the flexible material.